United States Patent [19]
Castillo

[11] Patent Number: 5,860,384
[45] Date of Patent: Jan. 19, 1999

[54] WAKE CONTROL APPARATUS

[76] Inventor: James D. Castillo, P.O. Box 7, Los Alamos, Calif. 93440

[21] Appl. No.: 982,709

[22] Filed: Dec. 2, 1997

[51] Int. Cl.[6] ....................................................... B63B 1/28
[52] U.S. Cl. .......................................... 114/280; 114/274
[58] Field of Search .................................... 114/274, 280, 114/282

[56] References Cited

U.S. PATENT DOCUMENTS

| Re. 12,791 | 5/1908 | Reeve | 114/282 |
|---|---|---|---|
| 3,294,052 | 12/1966 | Jones | 114/282 |
| 4,915,048 | 4/1990 | Stanford | 114/274 |
| 5,315,951 | 5/1994 | Finkl | 114/280 |
| 5,549,071 | 8/1996 | Pigeon et al. | 114/286 |

*Primary Examiner*—Ed L. Swinehart
*Attorney, Agent, or Firm*—Stetina Brunda Garred & Brucker

[57] ABSTRACT

A wake control apparatus for adjusting the trim of a watercraft to selectively raise and lower the level of the wake produced by the watercraft. The apparatus comprises at least one hydrofoil which is pivotally connectable to the watercraft, and at least one actuator which is mechanically coupled to the hydrofoil and connectable to the watercraft. The actuator is adapted to selectively move the hydrofoil between first and second positions. When the apparatus is connected to the watercraft and the watercraft is propelled within the water, the movement of the hydrofoil toward the second position causes the aft end of the watercraft to be drawn downwardly into the water to increase the level of the wake produced thereby. The movement of the hydrofoil toward the first position causes the aft end of the watercraft to be elevated within the water to reduce the level of the wake produced thereby.

5 Claims, 3 Drawing Sheets

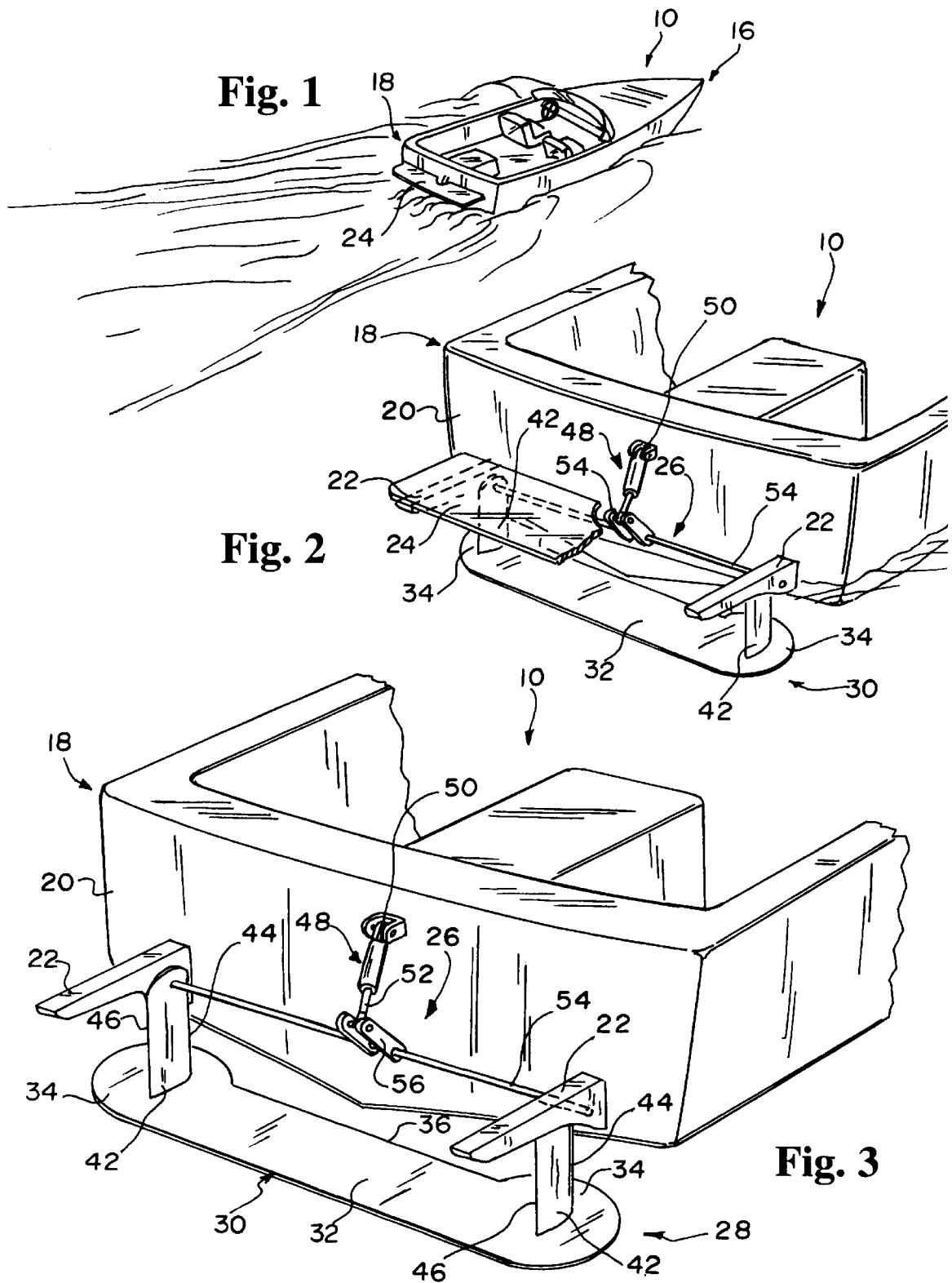

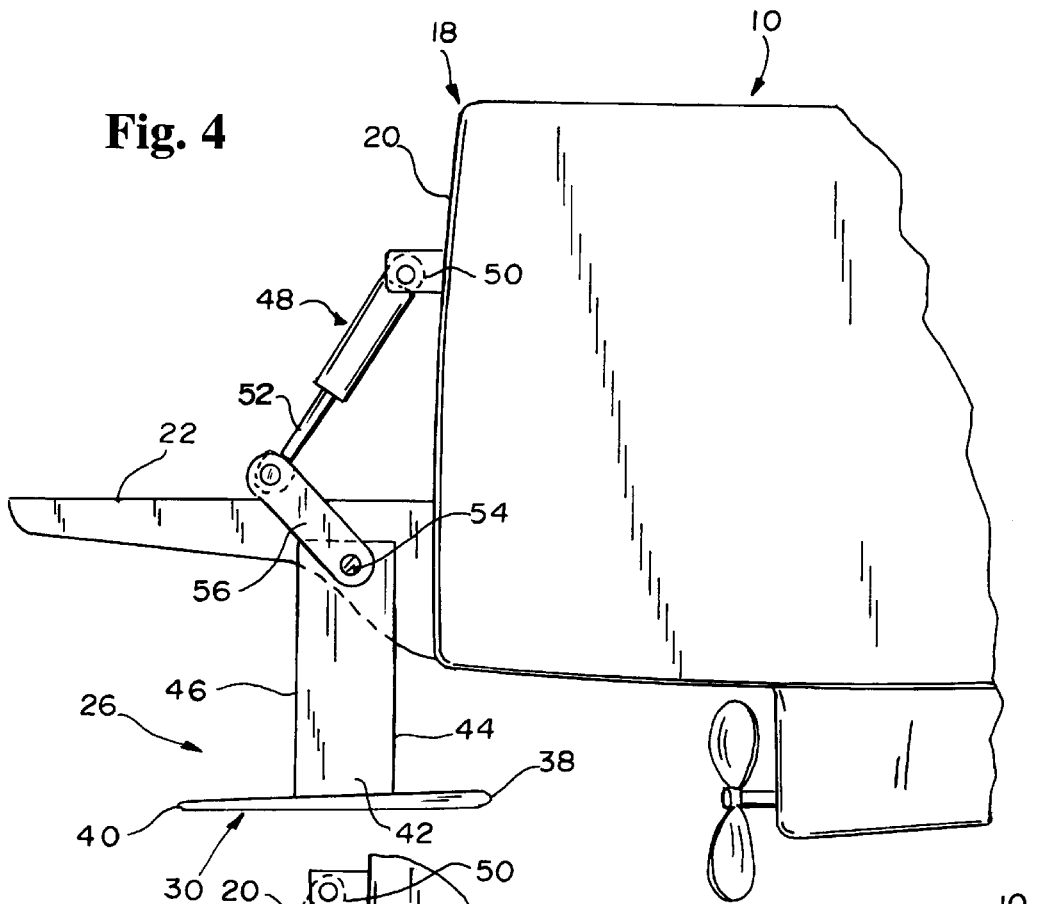
Fig. 4
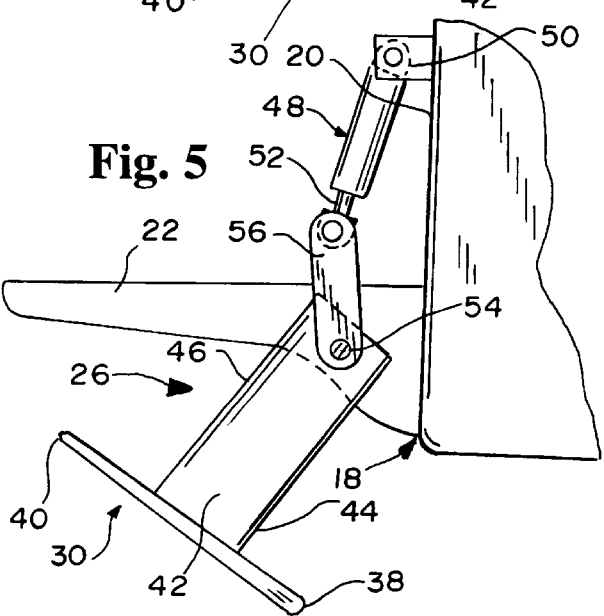
Fig. 5
Fig. 6

WAKE CONTROL APPARATUS

FIELD OF THE INVENTION

The present invention relates generally to watercraft, and more particularly to a wake control apparatus which may be retrofitted to an existing watercraft or provided as original equipment thereon for adjusting the trim of the watercraft to selectively raise or lower the level of the wake produced thereby when the watercraft is propelled within the water.

BACKGROUND OF THE INVENTION

A water sport which is rapidly growing in popularity is "wake boarding". In wake boarding, a participant riding a device known as a wake board is pulled behind a watercraft such as a boat via a tow line in the same manner a water skier is pulled behind a boat. The participant maneuvers himself or herself laterally across the wake produced by the moving watercraft in a slalom-like fashion, with the passage of the wake board over the wake lifting the participant into the air and allowing for the performance of various flips or other tricks prior to the participant landing back onto the surface of the water. sA will be recognized by the foregoing description of wake boarding, it is highly desirable to adjust the level of the wake produced by the boat or other watercraft depending upon the type of "ride" sought by the wake boarding participant. In this respect, the adjustment of the trim of the boat so as to cause the aft end to set lower within the water than the forward end when the boat is propelled increases the height of the wake produced thereby. Conversely, the adjustment of the trim of the boat so as to maintain the aft end at an orientation which is substantially level with the forward end when the boat is propelled reduces the level of the wake produced thereby. Though certain adjustments may be made to the trim of a boat including an outboard motor by changing the orientation of the propeller within the water, such trim adjustments are not easily obtainable with boats that include inboard motors. Additionally, the trim adjustment, and hence changes to the wake level and shape, which may be accomplished with boats including outboard motors is somewhat limited.

The present invention comprises a wake control apparatus which may be retrofitted to an existing boat or other type of watercraft or provided as original equipment thereon. The wake control apparatus of the present invention is specifically adapted to allow the trim of the watercraft to be adjusted for purposes of selectively raising or lowering the level the wake produced thereby. In this respect, the present invention finds particular utility for use in relation to various water sports, and most notably wake boarding and water skiing wherein it is often desirable to raise or lower the level or modify the shape of the wake produced by the watercraft.

SUMMARY OF THE INVENTION

In accordance with the present invention, there is provided a wake control apparatus for adjusting the trim of a watercraft to selectively raise or lower the level of the wake produced thereby. In a first embodiment of the present invention, the apparatus comprises a hydrofoil which is pivotally connectable to the watercraft. Mechanically coupled to the hydrofoil is an actuator which is itself pivotally connectable to the watercraft and adapted to selectively move the hydrofoil between first and second positions. When the wake control apparatus is connected to the watercraft and the watercraft is propelled within the water, the movement of the hydrofoil toward its second position causes the aft end of the watercraft to be drawn downwardly into the water, thus increasing the level of the wake produced thereby. Conversely, the movement of the hydrofoil toward its first position causes the aft end of the watercraft to be elevated within the water, thus reducing or decreasing the level of the wake produced thereby.

In the first embodiment, the hydrofoil itself comprises an elongate main foil section having a pair of fins attached thereto and extending upwardly therefrom in spaced, generally parallel relation to each other. The actuator preferably comprises a hydraulic cylinder which includes a reciprocally moveable piston rod extending therefrom. The piston rod is mechanically coupled to the hydrofoil via a linkage assembly which comprises an elongate actuation rod attached to and extending between the fins of the hydrofoil. Rigidly attached to the actuation rod is one end of a link member, the other end of which is pivotally connected to the piston rod.

In accordance with a second embodiment of the present invention, the wake control apparatus comprises a spaced pair of hydrofoils which are pivotally connectable to the watercraft, and an actuator which is mechanically coupled to the hydrofoils and adapted to concurrently move the same between their first and second positions. Each of the hydrofoils may comprise a circularly or elliptically configured main foil section having a fin attached thereto and extending upwardly therefrom. As in the first embodiment, the actuator of the second embodiment is pivotally connectable to the watercraft and preferably comprises a hydraulic cylinder having a reciprocally movable piston rod extending therefrom. The piston rod is mechanically coupled to the hydrofoils via a linkage assembly which comprises an elongate actuation rod attached to and extending between the fins of hydrofoils. Rigidly attached to the actuation rod is one end of a link member, the other end of which is pivotally connected to the piston rod of the actuator.

In accordance with a third embodiment of the present invention, the wake control apparatus comprises a spaced pair of hydrofoils which are pivotally connectable to the watercraft, and a pair of actuators which are mechanically coupled to respective ones of the hydrofoils and adapted to concurrently move the hydrofoils between their first and second positions. Each of the hydrofoils of third embodiment comprises a circularly or elliptically configured main foil section having a fin attached thereto and extending upwardly therefrom. Additionally, each of the actuators is pivotally connectable to the watercraft and preferably comprises a hydraulic cylinder having a reciprocally movable piston rod extending therefrom. The piston rod of each of the actuators is pivotally connected to the fin of a respective one of the hydrofoils.

Those of ordinary skill in the art will recognize that numerous configurations are available for the hydrofoil(s) constructed in accordance with the first, second and third embodiments of the present invention. Additionally, the elongate actuation rod included in the first and second embodiments of the present invention may be specifically configured to eliminate the "rooster tail" normally produced by the prop thrust of the watercraft.

BRIEF DESCRIPTION OF THE DRAWINGS

These, as well as other features of the present invention, will become more apparent upon reference to the drawings wherein:

FIG. 1 is a perspective view illustrating the manner in which a wake is produced by a watercraft moving along the surface of a body of water;

FIG. 2 is a perspective view of a wake control apparatus constructed in accordance with a first embodiment of the present invention, illustrating the apparatus in its first position within the water for reducing the level of the wake produced by the watercraft;

FIG. 3 is a perspective view of the wake control apparatus of the first embodiment in its first position;

FIG. 4 is a side elevational view of the wake control apparatus of the first embodiment in its first position as shown in FIGS. 2 and 3;

FIG. 5 is a side elevational view of the wake control apparatus of the first embodiment in its second position for increasing the level of the wake produced by the watercraft;

FIG. 6 is a side elevational view illustrating the trim of the watercraft when the wake control apparatus of the first embodiment is in its second position shown in FIG. 5;

DETAILED DESCRIPTION OF THE PREFERRED EMBODIMENTS

Figure 7:
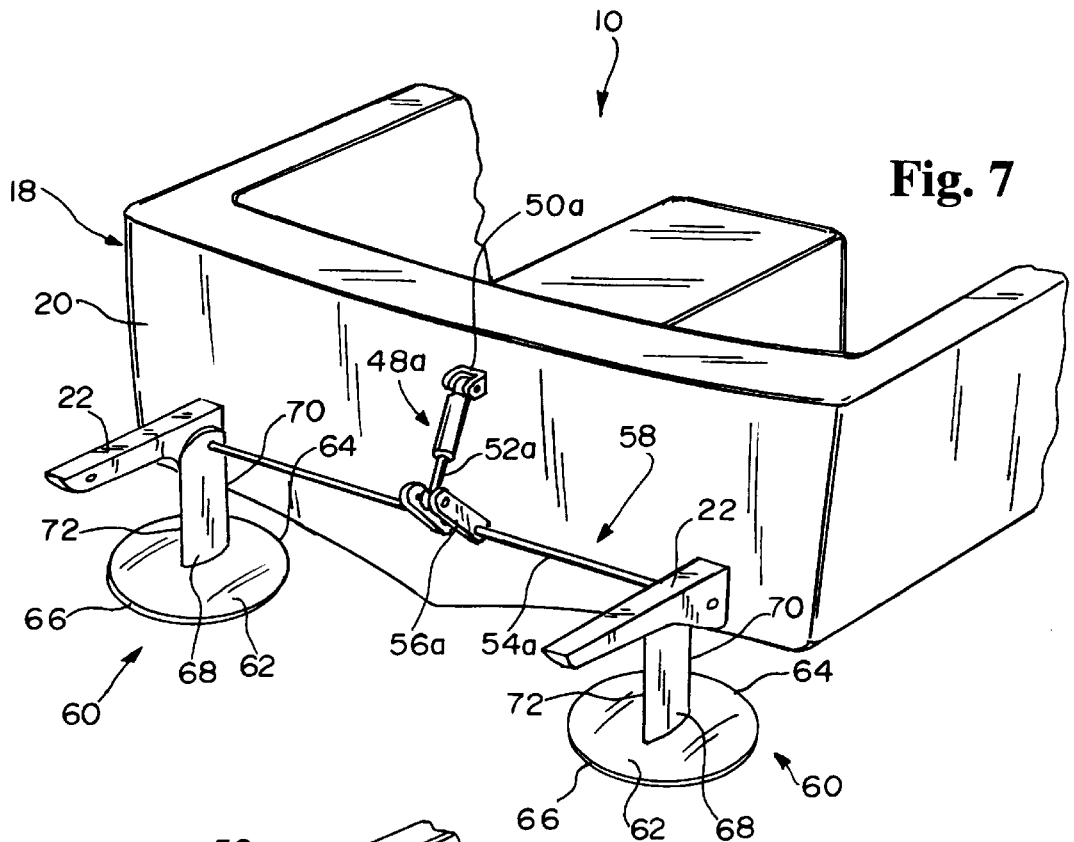
FIG. 7 is a perspective view of a wake control apparatus constructed in accordance with a second embodiment of the present invention.

Referring now to the drawings wherein the showings are for purposes of illustrating preferred embodiments of the present invention only, and not for purposes of limiting the same, FIG. 1 perspectively illustrates a boat 10 with which the wake control apparatus of the present invention as will be described in more detail below is preferably utilized. The boat 10 shown in FIGS. 1–7 includes an inboard motor. However, as will be discussed below, one embodiment of the wake control apparatus of the present invention may be used in conjunction with a boat 12 (shown in FIG. 8) which includes an outboard motor 14. Though the wake control apparatus of the present invention is preferably used in conjunction with either the boat 10 or the boat 12, it will be recognized that it may also be used in conjunction with other types of watercraft as well.

Referring now to FIGS. 2–6, the boat 10 includes a forward end 16 and an aft end 18 which is defined by a transom 20. Attached to the transom 20 and extending rearwardly therefrom in spaced, generally parallel relation to each other is a pair of swim step supports 22. As best seen in FIGS. 1 and 2, disposed upon the generally co-planar top surfaces of the swim step supports 22 and attached thereto is a swim step 24. In the typical construction of the boat 10, the swim step 24 (including the swim steps supports 22) is provided as original equipment on the transom 20 thereof.

FIGS. 2–6 illustrate a wake control apparatus 26 constructed in accordance with a first embodiment of the present invention. As best seen in FIGS. 2 and 3, the apparatus 26 comprises a hydrofoil 28 which itself includes an elongate main foil section 30. The main foil section 30 defines a rectangularly configured central portion and opposed, enlarged end portions 34. The end portions 34 of the main foil section 30 have generally circular configurations and protrude forwardly from the front edge 36 of the central portion 32. As best seen in FIGS. 4 and 5, the main foil section 30 preferably has a generally elliptical or tear-drop shaped cross-sectional configuration, with the leading edge 38 thereof (defined by the front edge 36 of the central portion 32 and the front edges of the end portions 34) having a rounded or radiused configuration and tapering to a trailing edge 40 which has a generally pointed configuration.

In addition to the main foil section 30, the hydrofoil 28 includes a pair of fins 42 which are attached to and extend upwardly from the top surface of the main foil section 30 in spaced, generally parallel relation to each other. In particular, each of the fins 42 is generally centrally positioned upon the top surface of a respective one of the end portions 34. Like the main foil section 30, each of the fins 42 preferably has a generally elliptical or tear-drop shaped cross-sectional configuration, with the leading edge 44 thereof having a rounded or radiused configuration and tapering to a trailing edge 46 which has a generally pointed configuration.

In addition to the hydrofoil 28, the wake control apparatus 26 of the first embodiment includes an actuator 48 which preferably comprises a hydraulic cylinder. One end of the actuator 48 is pivotally connected to the transom 20 of the boat 10 via a mounting bracket 50. Extending from the other end of the actuator 48 is a reciprocally movable piston rod 52. In the wake control apparatus 26, the actuator 48, and in particular the piston rod 52 thereof, is mechanically coupled to the hydrofoil 28 via a linkage assembly which comprises an elongate actuation rod 54. The hydrofoil 28, and in particular the fins 42 thereof, are rigidly attached to the actuation rod 54 which protrudes outwardly beyond the outer surfaces of the fins 42. In this respect, the opposed ends of the actuation rod 54 protruding outwardly from the fins 42 are preferably rotatably connected to respective ones of the swim step supports 22.

In addition to the actuation rod 54, the linkage assembly includes a link member 56. In the wake control apparatus 26, one end of the link member 56 is rigidly attached to the actuation rod 54, with the other end of the link member 56 being pivotally connected to the distal end of the piston rod 52 of the actuator 48.

When the wake control apparatus 26 is connected to the boat 10 in the aforementioned manner, the movement of the piston rod 52 outwardly relative to the actuator 48 results in the movement (i.e., the counter-clockwise rotation) of the hydrofoil 28 to its first position as shown in FIG. 4. When the hydrofoil 28 is in its first position, the leading edge 38 of the main foil section 30 is tilted slightly upwardly toward the boat 10. As such, when the boat 10 is propelled through the water, the moving water directly impinges the bottom surface of the main foil section 30 of the hydrofoil 28 and applies upward pressure thereto. As will be recognized, the propulsion of the boat 10 through the water and the direct impingement of the moving water against the bottom surface of the main foil section 30 facilitates the creation of a vacuum on the top surface thereof. In this respect, a pressure differential is created between the top and bottom surfaces of the main foil section 30, with pressure being exerted solely against the bottom surface. The upward force exerted against the bottom surface of the main foil section 30 by the water lifts the hydrofoil 28 within the water, which in turn cases the aft end 18 of the boat 10 to be elevated within the water. As will be recognized, such elevation results in a reduction or lowering of the level of the wake produced by the boat 10.

As shown in FIG. 5, the movement of the piston rod 52 inwardly relative to the actuator 48 results in the clockwise rotation of the hydrofoil 28 to its second position. When the hydrofoil 28 is in its second position, the leading edge 38 of the main foil section 30 is tilted downwardly away from the boat 10. As such, when the boat 10 is propelled through the water, the moving water directly impinges the top surface of the main foil section 30 of the hydrofoil 28 and applies downward pressure thereto. In this respect, a pressure differential is again created between the top and bottom surfaces of the main foil section 30, with pressure being exerted solely against the top surface thereof. The downward force exerted against the top surface of the main foil section 30 by the water lowers the hydrofoil 28 within the water, which in turn causes the aft end 18 of the boat 10 to be drawn downwardly into the water in the manner shown in FIG. 6. As will be recognized, this movement results in an increase in the level of wake produced by the boat 10.

As such, by adjusting the trim of the boat 10 via the movement of the hydrofoil 28 between its first and second positions as described above, the level or height of the wake produced by the boat 10 may be selectively raised and lowered. It is contemplated that the wake control apparatus 26 may be provided as a separate unit which is retrofitted to the boat 10, or may be provided as original equipment on the boat 10. Additionally, though the wake control apparatus 26 is configured for connection to the transom 20 and swim step supports 22, it will be recognized that it may alternatively be configured for attachment to other parts of the boat 10, or to other types of watercraft.

Referring now to FIG. 7, there is depicted a wake control apparatus 58 which is constructed in accordance with a second embodiment of the present invention. The wake control apparatus 58 of the second embodiment is configured to be retrofitted to the boat 10 or to be provided as original equipment thereon. In the second embodiment, the wake control apparatus 58 comprises an identically configured pair of hydrofoils 60. Each of the hydrofoils 60 includes a main foil section 62 which preferably has a generally circular or elliptical configuration. Additionally, each main foil section 62 preferably has a generally elliptical or tear-drop shaped cross-sectional configuration, with the leading edge 64 thereof having a rounded or radiused configuration and tapering to a trailing edge 66 which has a generally pointed configuration.

In addition to the main foil section 62, each of the hydrofoils 60 of the wake control apparatus 58 includes a fin 68 which is attached to and extends upwardly from the approximate center of the top surface of the main foil section 62. Like the main foil sections 62, each fin 68 preferably has a generally elliptical or tear-drop shaped cross-sectional configuration, with the leading edge 70 thereof having a rounded or radiused configuration and tapering to a trailing edge 72 which has a generally pointed configuration.

In addition to the hydrofoils 60, the wake control apparatus 58 of the second embodiment includes an actuator 48a which is identically configured to the previously described actuator 48 and preferably comprises a hydraulic cylinder. One end of the actuator 48a is pivotally connected to the transom 20 of the boat 10 via a mounting bracket 50a. Extending from the other end of the actuator 48a is a reciprocally movable piston rod 52a. In the wake control apparatus 58, the actuator 48a, and in particular the piston rod 52a thereof, is mechanically coupled to the hydrofoils 60 via a linkage assembly which is configured identically to the linkage assembly previously described in relation to the wake control apparatus 26 of the first embodiment. In this respect, the linkage assembly of the wake control apparatus 58 comprises an elongate actuation rod 54a. The hydrofoils 60, and in particular the fins 68 thereof, are rigidly attached to the actuation rod 54a adjacent respective ones of the opposed ends thereof. The opposed ends of the actuation rod 54a protrude outwardly beyond the outer surfaces of the fins 68, and are preferably rotatably connected to respective ones of the swim step supports 22 of the boat 10.

In addition to the actuation rod 54a, the linkage assembly of the wake control apparatus 58 includes a link member 56a which extends between the actuator 48a and actuation rod 54a. In this respect, one end of the link member 56a is rigidly attached to the actuation rod 54a, with the other end of the link member 56a being pivotally connected to the distal end of the piston rod 52a of the actuator 48a.

The wake control apparatus 58 of the second embodiment functions in the same manner as previously described in relation to the wake control apparatus 26 of the first embodiment. In the this respect, the movement of the piston rod 52a outwardly relative to the actuator 48a results in the counter-clockwise rotation of the hydrofoils 60 to their first positions (as shown in FIG. 7) wherein the leading edges 64 of the main foil sections 62 are tilted slightly upwardly toward the boat 10. Conversely, the movement of the piston rod 52a inwardly relative to the actuator 48a results in the clockwise rotation of the hydrofoils 60 to their second positions wherein the leading edges 64 of the main foil sections 62 are tilted downwardly away from the boat 10.

Figure 8:
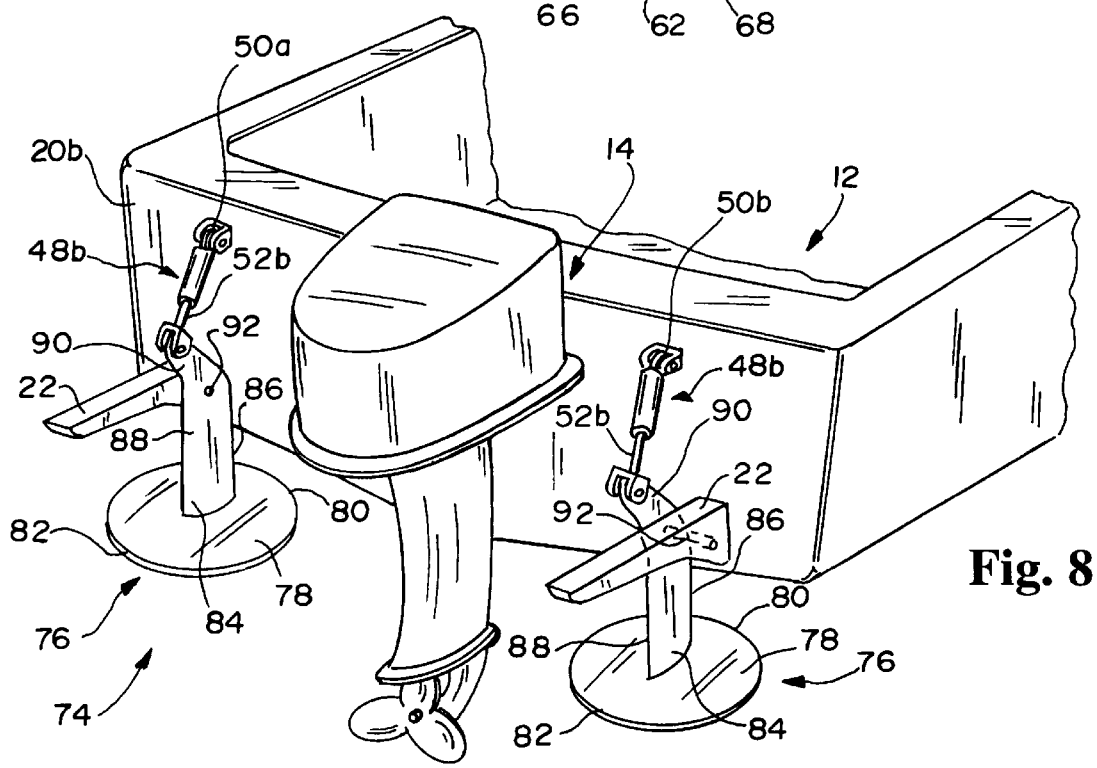
FIG. 8 is a perspective view of a wake control apparatus constructed in accordance with a third embodiment of the present invention.

Referring now to FIG. 8, there is depicted a wake control apparatus 74 which is constructed in accordance with a third embodiment of the present invention. The wake control apparatus 74 of the third embodiment is specifically configured to be retrofitted to or provided as original equipment on the boat 12 which, as previously explained, includes the outboard motor 14 rather than an inboard motor. The wake control apparatus 74 comprises an identically configured pair of hydrofoils 76, each of which includes a main foil section 78 having a generally circular or elliptical configuration. Each main foil section 78 also has a generally elliptical or tear-drop shaped cross-sectional configuration, with the leading edge 80 thereof having a rounded or radiused configuration and tapering to a trailing edge 82 which has a generally pointed configuration.

In addition to the main foil section 78, each hydrofoil 76 includes a fin 84 which is attached to and extends upwardly from the approximate center of the main foil section 78. Like the main foil sections 78, each fin 84 preferably has a generally elliptical or tear-drop shaped cross-sectional configuration, with the leading edge 86 thereof having a rounded or radiused configuration and tapering to a trailing edge 88 which has a generally pointed configuration. Additionally, each fin 84 includes a rearwardly extending ear portion 90, the use of which will be described in more detail below.

In the wake control apparatus 74 of the third embodiment, each of the hydrofoils 76 is pivotally connected to a respective one of the swim step supports 22 of the boat 12. Such pivotal connection is preferably facilitated by a pair of pivot pins 92 which are rigidly attached to and extend laterally outward from respective ones of the fins 84 and are rotatably connected to respective ones of the swim step supports 22.

The wake control apparatus 74 of the third embodiment further comprises a pair of actuators 48b which are identically configured to the previously described actuators 48, 48a of the first and second embodiments, and preferably comprise hydraulic cylinders. One end of each of the actuators 48b is pivotally connected to the transom 20b of the boat 12 via a mounting bracket 50b. Extending from the other end of each of the actuators 48b is a reciprocally movable piston rod 52b. In the wake control apparatus 74, the distal end of each piston rod 52b is pivotally connected to the ear portion 90 of the fin 84 of a respective one of the hydrofoils 76.

When the wake control apparatus 74 is connected to the boat 12 in the previously described manner, the hydrofoils are disposed on opposite sides of the outboard motor 14. The wake control apparatus 74 functions in a manner similar to that previously described in relation to the first and second embodiments. In this respect, the simultaneous movement of the piston rods 52b outwardly relative to the actuators 48b results in the concurrent counter-clockwise rotation of the hydrofoils 76 to their first positions (as shown in FIG. 8) wherein the leading edges 80 thereof are tilted slightly upwardly toward the boat 12. Conversely, the simultaneous movement of the piston rods 52b inwardly relative to the actuators 48b results in the concurrent clockwise rotation of the hydrofoils 76 to their second positions wherein the leading edges 80 of the main foil sections 78 are tilted downwardly away from the boat 12.

Those of ordinary skill in the art will recognize that the hydrofoil 28 of the first embodiment, including the main foil section 30 and/or fins 42 thereof, may be formed to have any one of numerous alternative configurations. Additionally, the fins 42 need not necessarily extend from the main foil section 30 in parallel relation to each other. Similarly, the hydrofoils 60, 76 of the second and third embodiments, including the main foil sections 62, 78 and/or fins 68, 84, may also be formed in any one of numerous available configurations. Further, the fins 68, 84 of the hydrofoils 60, 76 need not necessarily extend in parallel relation to each other.

In addition to the foregoing, the wake control apparatuses 26, 58, 74 constructed in accordance with the first, second and third embodiments of the present invention need not be attached to the swim step supports 22, and may be attached directly to the transom 20 of the boat 10, 12 or to the underside of the hull thereof. If the weight control apparatuses 26, 58, 74 are attached directly to the transom 20 or hull of the boat 10, 12, it is contemplated that the fins 42, 68, 84 of the hydrofoil(s) 28, 60, 76 will be formed to have arcuate configurations so as to facilitate the positioning of the main foil section(s) 30, 62, 78 rearwardly relative to the transom 20.

Moreover, as described above, the actuation rod 54, 54a of the wake control apparatuses 26, 58 constructed in accordance with the first and second embodiments may be configured so as to eliminate the rooster tail typically formed from the prop thrust of the boat 10, 12. Additionally, though the actuators 48, 48a, 48b preferably comprise a hydraulic cylinder, they may alternatively comprise other types of linear actuators, such as those including a lead screw. The linkage assembly previously described in relation to the first and second embodiments may also be replaced by a linkage assembly having an alternative configuration.

Additional modifications and improvements of the present invention may also be apparent to those of ordinary skill in the art. Thus, the particular combination of parts described and illustrated herein is intended to represent only certain embodiments of the present invention and is not intended to serve as limitations of alternative devices within the spirit and scope of the invention.

What is claimed is:

1. A wake control apparatus for adjusting the trim of a watercraft to selectively raise and lower the level of the wake produced thereby, said apparatus comprising:
   at least one hydrofoil pivotally connectable to the watercraft and including:
      an elongate main foil section having a rectangularly configured central portion which defines a front edge, and opposed, enlarged end portions which have generally circular configurations and protrude forwardly from the front edge of the central portion; and
      a pair of fins attached to and extending upwardly from respective ones of the end portions of the main foil section;
   at least one actuator mechanically coupled to the hydrofoil and connectable to the watercraft, said actuator being adapted to selectively move the hydrofoil between first and second positions;
   wherein when the apparatus is connected to the watercraft and the watercraft is propelled within the water, the movement of the hydrofoil toward the second position causes the aft end of the watercraft to be drawn downwardly into the water to increase the level of the wake produced thereby, with the movement of the hydrofoil toward the first position causing the aft end of the watercraft to be elevated within the water to reduce the level of the wake produced thereby.

2. The apparatus of claim 1 wherein said at least one actuator is pivotally connectable to the watercraft and includes a reciprocally moveable piston rod which is mechanically coupled to the hydrofoil via a linkage assembly comprising:
   an elongate actuation rod attached to and extending between the fins of the hydrofoil; and
   a link member rigidly attached to the actuation rod and pivotally connected to the piston rod.

3. The apparatus of claim 2 wherein the at least one actuator comprises a hydraulic cylinder.

4. A wake control apparatus for adjusting the trim of a watercraft to selectively raise and lower the level of the wake produced thereby, said apparatus comprising:
   a spaced pair of hydrofoils, each of the hydrofoils including:
      a main foil section; and
      a fin attached to an extending upwardly from the main foil section;
   at least one actuator for concurrently moving the hydrofoils between first and second positions, the actuator being pivotally connectable to the watercraft and including a reciprocally movable piston rod which is mechanically coupled to the hydrofoils via a linkage assembly comprising:
      an elongate actuation rod attached to and extending between the fins of the hydrofoils; and
      a link member rigidly attached to the actuation rod and pivotally connected to the piston rod;
   wherein when the apparatus is connected to the watercraft and the watercraft is propelled within the water, the movement of the hydrofoils toward the second positions causes the aft end of the watercraft to be drawn downwardly into the water to increase the level of the wake produced thereby, with the movement of the hydrofoils toward the first positions causing the aft end of the watercraft to be elevated within the water to reduce the level of the wake produced thereby.

5. The apparatus of claim 4 wherein said at least one actuator comprises a hydraulic cylinder.

* * * * *